(12) United States Patent
Großpietsch et al.

(10) Patent No.: US 11,621,596 B2
(45) Date of Patent: Apr. 4, 2023

(54) ROTOR CARRIER FOR AN ELECTRICAL MACHINE

(71) Applicant: ZF FRIEDRICHSHAFEN AG, Friedrichshafen (DE)

(72) Inventors: Wolfgang Großpietsch, Schweinfurt (DE); Angelika Ebert, Schonungen (DE); Monika Rößner, Donnersdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 25 days.

(21) Appl. No.: 17/258,969

(22) PCT Filed: Jul. 8, 2019

(86) PCT No.: PCT/EP2019/068245
§ 371 (c)(1),
(2) Date: Jan. 8, 2021

(87) PCT Pub. No.: WO2020/011707
PCT Pub. Date: Jan. 16, 2020

(65) Prior Publication Data
US 2021/0126498 A1 Apr. 29, 2021

(30) Foreign Application Priority Data
Jul. 10, 2018 (DE) ..................... 10 2018 211 377.7

(51) Int. Cl.
*H02K 9/19* (2006.01)
*H02K 1/30* (2006.01)
(Continued)

(52) U.S. Cl.
CPC ................. *H02K 1/30* (2013.01); *B60K 6/26* (2013.01); *B60K 6/38* (2013.01); *H02K 1/32* (2013.01);
(Continued)

(58) Field of Classification Search
CPC .......... H02K 7/006; H02K 7/10; H02K 7/108; H02K 9/19
See application file for complete search history.

(56) References Cited

U.S. PATENT DOCUMENTS

2006/0289209 A1* 12/2006 Grosspietsch .......... B60L 50/16
180/65.25
2008/0072586 A1 3/2008 Hammond et al.
(Continued)

FOREIGN PATENT DOCUMENTS

DE 102005053887 5/2007
DE 102006056512 6/2008
(Continued)

OTHER PUBLICATIONS

Office Action of the corresponding German Patent Application No. 10 2018 211 377.7.

*Primary Examiner* — Dang D Le
(74) *Attorney, Agent, or Firm* — Cozen O'Connor

(57) ABSTRACT

A rotor carrier for a rotor of an electric machine and to a hybrid module. The rotor carrier includes a tubular base body and receptacles for parts of a clutch are provided on an inner circumferential surface remote of the rotor. The base body is connected to a hub by a connection element arranged adjacent to the receptacles. The connection element is formed by a radially extending annular flange, and in that the radially extending annular flange is arranged in axial direction between the receptacles and one end of the base body, or is characterized in that the base body is formed integral with a converter housing, and in that the connection element is formed by a radially extending housing wall or a housing cover of the converter housing.

13 Claims, 3 Drawing Sheets

(51) Int. Cl.
*B60K 6/26* (2007.10)
*B60K 6/38* (2007.10)
*H02K 1/32* (2006.01)
*H02K 7/00* (2006.01)
*H02K 7/04* (2006.01)
*H02K 7/10* (2006.01)
*H02K 7/108* (2006.01)
*B60K 6/24* (2007.10)

(52) U.S. Cl.
CPC ............... *H02K 7/006* (2013.01); *H02K 7/04* (2013.01); *H02K 7/10* (2013.01); *H02K 7/108* (2013.01); *B60K 6/24* (2013.01); *H02K 9/19* (2013.01)

(56) References Cited

U.S. PATENT DOCUMENTS

| | | |
|---|---|---|
| 2011/0240430 A1 | 10/2011 | Iwase et al. |
| 2013/0192947 A1* | 8/2013 | Frait ........................ B60K 6/48 |
| | | 192/3.32 |
| 2013/0193816 A1* | 8/2013 | Iwase ...................... B60L 50/16 |
| | | 310/75 R |
| 2015/0033889 A1 | 2/2015 | Shibata et al. |
| 2015/0239336 A1* | 8/2015 | Kasuya .................... B60K 6/54 |
| | | 74/661 |

FOREIGN PATENT DOCUMENTS

| | | |
|---|---|---|
| DE | 102009059944 | 7/2010 |
| DE | 102009045727 | 4/2011 |
| DE | 102016215595 | 2/2018 |
| EP | 2727666 | 5/2014 |
| WO | WO 2017196601 | 11/2017 |

\* cited by examiner

ROTOR CARRIER FOR AN ELECTRICAL MACHINE

CROSS REFERENCE TO RELATED APPLICATIONS

This is a U.S. national stage of Application No. PCT/EP2019/068245 filed Jul. 8, 2019. Priority is claimed on German Application No. DE 10 2018 211 377.7 filed Jul. 10, 2018 the content of which is incorporated herein by reference.

BACKGROUND OF THE INVENTION

1. Field of the Invention

The invention is directed to a rotor carrier for an electric machine, particularly in a hybrid powertrain of a vehicle.

2. Description of Related Art

Besides solid rotors, annular rotors, which are arranged around an axis of rotation, are known in the prior art in electric machines. It is known, for example, from DE 10 2005 053 887 A1 or US 2013/0192947 A1 that a lamination stack of a rotor is received on a sleeve and the sleeve is directly connected to a torque converter downstream.

SUMMARY OF THE INVENTION

It is an object of one aspect of the invention to provide an alternative to the prior art which has a better support of the rotor, makes optimal use of installation space and is also simple and economical to produce.

According to one aspect of the invention, a rotor carrier for a rotor of an electric machine comprises a tubular base body, the base body has engagement elements on an outer circumferential surface facing the rotor which make possible a positive engagement connection and/or frictional engagement connection between the base body and rotor, receptacles for parts of a clutch are provided on an inner circumferential surface remote of the rotor along a portion of the axial extension, and the base body is connected to a hub by a connection element arranged adjacent to the receptacles. The rotor carrier is characterized in that the connection element is formed by a radially extending annular flange and in that the radially extending annular flange is arranged in axial direction between the receptacles and one end of the base body. A profiling, for example, is provided at the base body for the connection between the base body and the rotor, projections and/or recesses being provided in the profiling at least on the outer circumferential surface, which projections and/or recesses cooperate with corresponding mating pieces on the inner surface of the rotor in order to produce a positive engagement connection. Alternatively or cumulatively, projections or recesses such as steps or annular grooves can also be provided in circumferential direction and are usable for a positive engagement connection or frictional engagement connection. A frictional engagement connection in which the rotor is connected to the base body via clamping elements, screws, rivets or the like can also be provided instead of a positive engagement connection. Material bond connections in which the rotor is welded to the base body are also possible in principle. Combinations in which different types of connections are used, for example, to form or secure connections in different directions, are also possible.

The base body is connected to a hub by a connection element in order to be able to transmit a torque. In this context, the term "hub" means and comprehends not only a conventional hub mounted on a shaft but also a direct connection to a shaft or also the connection to a component part downstream in the powertrain, for example, a converter housing. The connection to the hub is carried out via a flange area of the connection element which is correspondingly shaped in radial direction.

Receptacles for parts of a clutch are provided at the inner circumferential surface of the base body. These parts are preferably grooves or projections in axial direction which serve to receive plates of a multiple-plate clutch. Accordingly, the base body is simultaneously the outer plate carrier of a clutch. The clutch can interrupt a flow of power from or to an internal combustion engine located upstream in the powertrain, for example.

Further rotor carriers, according to one aspect of the invention, for a rotor of an electric machine, wherein the rotor carrier comprises a tubular base body, wherein the base body has connection elements on an outer circumferential surface facing the rotor which make possible a positive engagement connection and/or frictional engagement connection between the base body and rotor, wherein receptacles for parts of a clutch are provided on an inner circumferential surface remote of the rotor along a portion of the axial extension, and wherein the base body is connected to a hub by a connection element arranged adjacent to the receptacles, are characterized in that the base body is formed integral with a converter housing and in that the connection element is formed by a radially extending housing wall or a housing cover of the converter housing.

The basic construction is the same as that previously described, wherein the base body is formed integral with a converter housing. The connection element is formed by a radially extending housing wall or a housing cover which is arranged axially adjacent to receptacles for parts of a clutch. In other words, the converter housing comprises the sleeve-shaped base body to which the rotor is fastened, a housing wall constructed as radial connection element extending inside of this base body, and the converter housing has an axially open area formed by the base body for receiving the clutch. The rotor carrier can be constructed with a reduced installation space by a construction of this kind.

Embodiment forms of a rotor carrier are characterized in that the annular flange is formed by a separate component part fixedly connected to the inner circumferential surface in axial direction as well as in circumferential direction. The geometry of the individual component parts and therefore also manufacturing are simplified by forming the base body and connection element as separate component parts. Welding, riveting, clinching or screwing are contemplated in particular for the connection between the base body and the annular flange, while other positive engagement connections in which corresponding protuberances at the base body or connection element engage in corresponding cutouts at the mating piece are also possible. It is also possible to combine different types of connections.

Alternative embodiment forms of a rotor carrier are characterized in that the annular flange is formed integral with the base body. When the base body and connection element are formed in one part, the power flow within the component part is improved and assembly costs for the connection are eliminated. Manufacturing processes such as primary forming, flow forming or reforming are contemplated for producing rotor carriers of this kind.

Rotor carriers according to embodiment forms are characterized in that the base body is formed at least at one axial end to be longer than the rotor. The length refers in this regard particularly to the length of the lamination stack of the rotor. By a base body protruding over the rotor, the positioning of the component parts by steps, cantilevers and the like can be improved on the one hand and cooling can be improved on the other hand when correspondingly configured. Further, a certain mechanical protection of the rotor is afforded by the protruding rotor carrier, more precisely, the protruding base body. The protruding base body can also be used in particular for balancing the rotor by fixing balancing weights to the protruding base body or by local removal of material.

Embodiment forms of a rotor carrier are characterized in that the base body has at least one cutout that is continuous in radial direction for the passage of oil. At least one cutout is provided in order to guide oil from the inner side to the outer side for lubrication and cooling. This cutout is preferably arranged in the area of an axial end of the lamination stack or so as to lead into an oil channel formed between the rotor carrier and the lamination stack.

Preferred embodiment forms of a rotor carrier are characterized in that the cutout is arranged in the base area of a groove provided at the inner circumferential surface. In addition to the cutouts, further guiding elements can be provided at the connection element or base body in order to guide oil impinging from the inside to the cutouts or to selectively deliver oil outward. These guiding elements can be constructed as channels, annular grooves, recesses or as other grooves, preferably so as to be inclined toward the cutouts. Alternatively, raised guiding elements are also possible as struts, projections or steps. These guiding elements can preferably serve at the same time as receptacles for the parts of a clutch and/or, farther along axially, can be used for producing a positive engagement connection between the connection element and base body.

Rotor carriers according to preferred embodiment forms are characterized in that a plurality of cutouts are arranged so as to be distributed over the circumference. A plurality of cutouts are distributed over the circumference, preferably symmetrically, for a more uniform distribution of the oil and to prevent an unbalance.

Preferred embodiment forms of a rotor carrier are characterized in that a plurality of cutouts are arranged in different planes that are axially spaced apart. In this regard, a plurality of cutouts can also be provided at different axial positions, for example, so that the cooling in axial direction can be improved on both sides.

Rotor carriers according to embodiment forms are characterized in that the base body has a different thickness in axial direction in the area of the receptacles than in the area of the connection element. Accordingly, the base body has a cross section that is changed in radial direction at least in one location along the axial extension. This can be utilized, for example, as a stop for positioning the base body and connection element relative to one another in order to fix the position simply and quickly during the assembly of the base body and connection element. Therefore, the use of circumferential steps or cantilevers is preferred because the latter can form stops in axial direction against which the corresponding mating piece can be pushed. Further, as a result of the different wall thicknesses, the amount of material can be adapted to loads so that the construction is as lightweight as possible.

Embodiment forms of a rotor carrier are characterized in that the base body is produced from a reformed tubular portion. Since the basic shape of the base body is given in case of a tubular portion, a base body can advantageously be produced from a tubular portion, which is shaped by corresponding reforming steps and/or machining steps to form a base body. Alternatively, the base body can also be shaped from a sheet metal.

Rotor carriers according to embodiment forms are characterized in that the connection element has an axial portion that extends parallel to the base body and is connected to the latter. In addition to a butt-contacting of the connection element with the base body, the connecting area of the connection element can be reformed, for example, so that a coaxially extending portion is formed with the base body, which coaxially extending portion extends inside the base body. The positioning in the base body and the production of the connection can be simplified by this connecting area. A coaxiality can also improve the stability of the connection element.

The axial portion preferably abuts the base body. The stability of the rotor carrier can be further improved by a contact between connection element and base body along the axial portion. Further, the contact area can be utilized additionally as connecting area or as part of the connecting area.

The axial portion of the connecting area is preferably arranged on the side of the connection element remote of the receptacles for parts of the clutch.

The connection element is preferably provided in the area of the middle half of the base body. The coaxial region of the connection element is formed shorter than the base body, and the axial portion of the connection element preferably has an axial length of less than 33% of the axial length of the base body. Accordingly, the power flow and the loading of the connection element can be reduced and axial installation space can be saved on the whole because component parts downstream of an output shaft can be provided at least partially inside the rotor protruding over the connection element.

A further advantageous effect of a two-part construction of a rotor carrier with base body and connection element consists in that possibly identical connection elements can be used for different base bodies of different rotors, which is advantageous with respect to manufacturing and costs. This effect also applies analogously for the base body because different connection elements can be utilized for installing identical base bodies, as the case may be, depending on the powertrain.

A further aspect of the invention is a hybrid module comprising an input shaft, a clutch, an electric machine, a torque converter and an output shaft, which is characterized in that a rotor carrier is provided according to one of the embodiment forms described above. Accordingly, the above-described advantages with respect to axial installation space and the like can be utilized in a hybrid module.

The embodiment forms are not limited to the examples given above and may be achieved through further corresponding constructions. The features of the embodiment forms may be combined in any desired manner.

BRIEF DESCRIPTION OF THE DRAWINGS

The invention will be described in more detail in the following referring to drawings. Like or similar elements are designated by consistent reference numerals. The drawings show.

DETAILED DESCRIPTION OF THE PRESENTLY PREFERRED EMBODIMENTS

Figure 1:
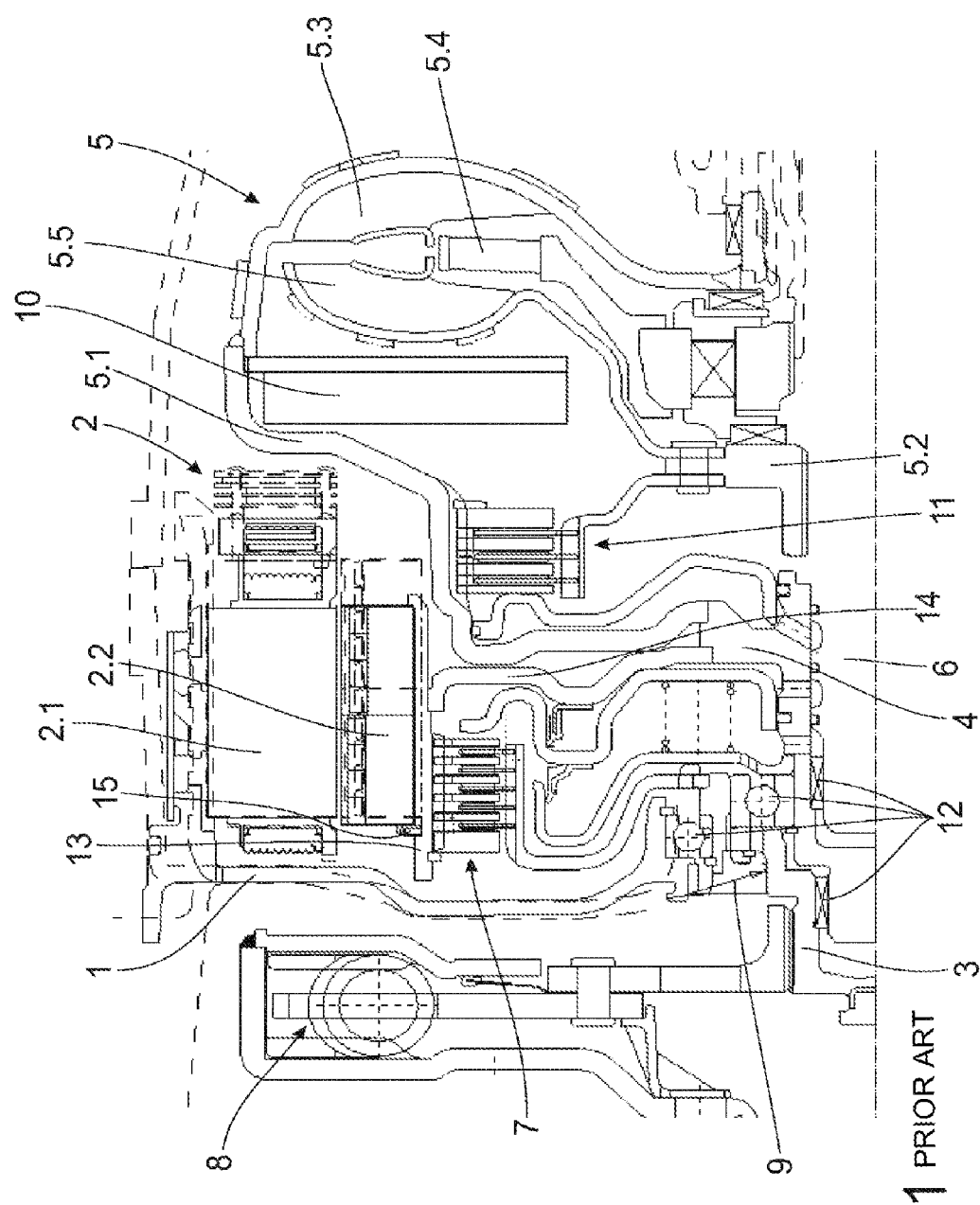
FIG. 1 is a schematic section of an embodiment example of a hybrid module.

FIG. 1 shows a hybrid module according to an embodiment example in a schematic sectional view, one half of which has been omitted in view of symmetry. The hybrid module comprises a housing 1 within which is arranged an electric machine 2 with a stator 2.1 fixed with respect to rotation relative to the housing 1 and with a rotatable rotor 2.2.

The hybrid module has a torque converter 5. The converter housing 5.1 is connected to a hub 4. An impeller 5.3 of the torque converter 5 is fixedly connected to a converter housing 5.1 of the torque converter 5. A stator wheel 5.4 of the torque converter 5 is supported so as to be fixed with respect to relative rotation in one rotational direction via a freewheel. A turbine wheel 5.5 of the torque converter 5 is connected to a turbine shaft 5.2 of the torque converter 5. The hybrid module further has an additional, optional torsional vibration mass damper 10 arranged within and on the converter housing 5.1. The turbine shaft 5.2 is connected to an output shaft 6 of an automatic transmission, not shown in more detail. Further, a lockup clutch 11 is arranged inside of the converter housing 5.1. The converter housing 5.1 is directly connectable to the turbine shaft 5.2 by engaging the lockup clutch 11.

The hub 4 is formed as a hollow shaft arranged coaxial to the output shaft 6 and so as to enclose the latter. In the depicted example, the input shaft 3 is likewise constructed as a hollow shaft and is arranged coaxial to the hub 4. A plurality of bearings 12 are provided between the output shaft 6 and the hub 4, between the hub 4 and the input shaft 3 and between the input shaft 3 and the housing 1 and support the component parts relative to one another. The hub 4 is connected on its outer side to the converter housing 5.1 and, via the rotor carrier, to one side of the clutch 7.

A vibration damper 8, which is connected to an internal combustion engine, not shown, is provided on the input shaft 3. Possible torsional vibrations are reduced by the vibration damper 8 in order to supply the hybrid module with a torque or rotational movement which is as uniform as possible. At the same time, positional tolerances and alignment tolerances between the internal combustion engine and the hybrid module can be compensated by the vibration damper 8. The input shaft 3 is further connected to a part of the clutch 7.

The housing 1 separates a wet space of the hybrid module from a dry space. The wet space is sealed relative to the dry space by a seal 9 arranged preferably directly adjacent to a bearing 12.

A clutch 7 by which the internal combustion engine can be disconnected from the rest of the powertrain is also provided inside the housing 1. To this end, the clutch 7 is arranged in the power flow between the input shaft 3 and the hub 4. More precisely, the parts of the clutch 7 are correspondingly connected to the input shaft 3 and to a rotor carrier. In the depicted embodiment example, the clutch 7 is constructed as a multiple-plate clutch.

The rotor 2.2 of the electric machine 2 is connected to a base body 13 of the rotor carrier. The base body 13 has a tubular body, the rotor 2.2 being mounted on the outer circumferential surface thereof. In the depicted embodiment example, the axial end of the base body 13 facing the torque converter 5 is reformed outward to form a collar which partially overlaps the rotor 2.2 in radial direction. Therefore, the collar offers a protection of the rotor 2.2 and can be used as a stop for positioning the rotor 2.2. By corresponding cutouts or balancing elements, not shown, the collar can also be used to guide oil for lubrication and cooling of the electric machine 2 or for balancing the electric machine 2, respectively. The opposite axial end of the base body 13 is constructed so as to be flush with the outer circumferential surface to allow the rotor 2.2 to be mounted. In order to secure the axial position of the rotor 2.2 on the base body 13, a retaining element 15 is provided in a groove. The retaining element 15 can be constructed such that it is at least partially elastic in order to compensate for manufacturing tolerances and the like.

The rotor carrier comprises a connection element 14 in addition to the base body 13. In the depicted embodiment example, the connection element 14 is formed annularly so as to extend substantially radially. A short axial portion of the connection element 14, which extends coaxial to the base body 13 forms a connection area by which the connection element 14 and the base body 13 are connected. At its inner circumferential surface, the base body 13 has a step which acts as a stop and positioning aid for the connection element 14. The outer circumferential surface of the connecting area is fixedly connected, preferably by welding, to the inner circumferential surface of the base body 13, although other types of connections are possible.

The base body 13 is provided with a profiling on the side remote of the torque converter 5 so as to form projections and recesses in the manner of a spline which are distributed over the circumference. These projections and recesses serve as receptacle for parts of the clutch 7, in the depicted example as receptacle of the outer plates of the clutch 7, such that the base body 13 constitutes the outer plate carrier of the clutch 7.

Figure 3:
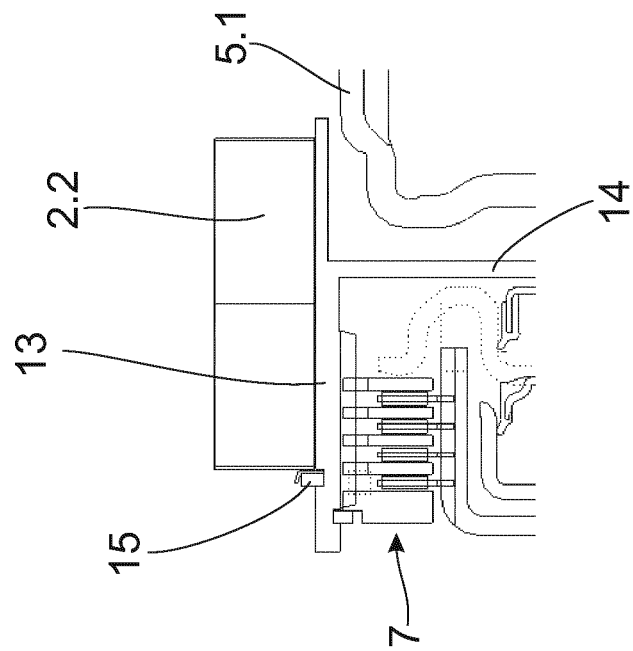
FIG. 3 is a subarea of a schematic section of a hybrid module in the region of the rotor.
Figure 2:
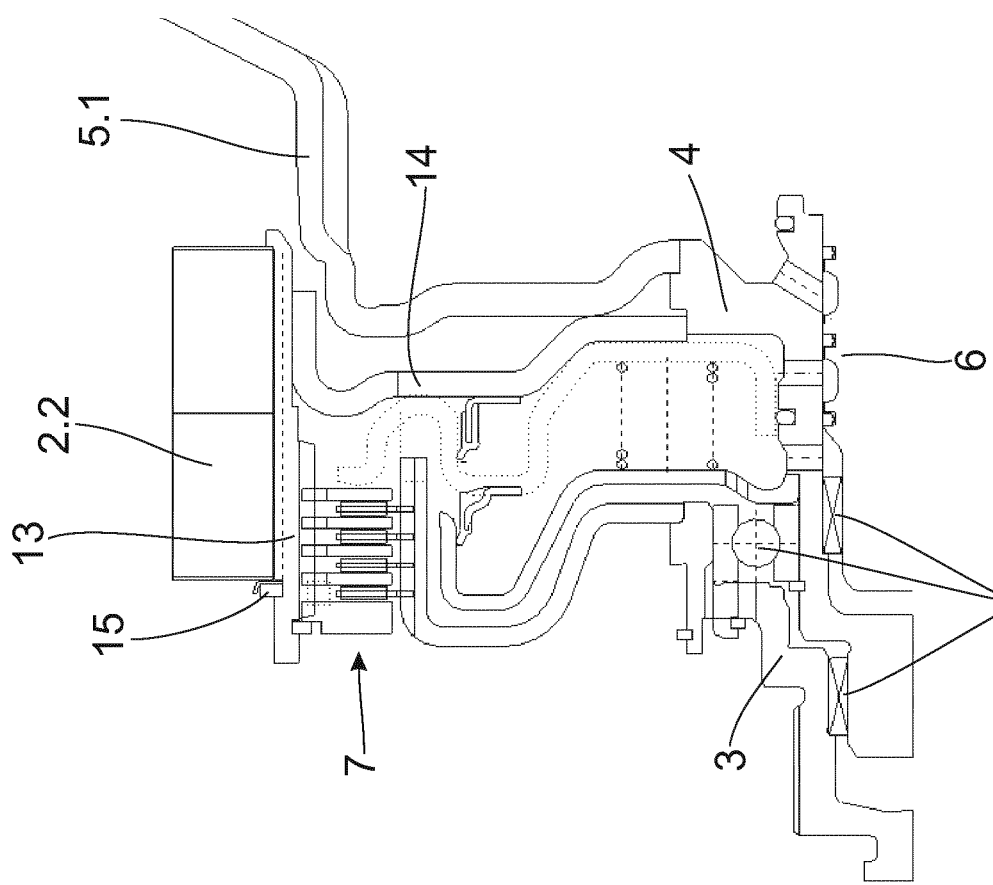
FIG. 2 is a subarea of a schematic section of a hybrid module in the region of the rotor carrier.
Figure 4:
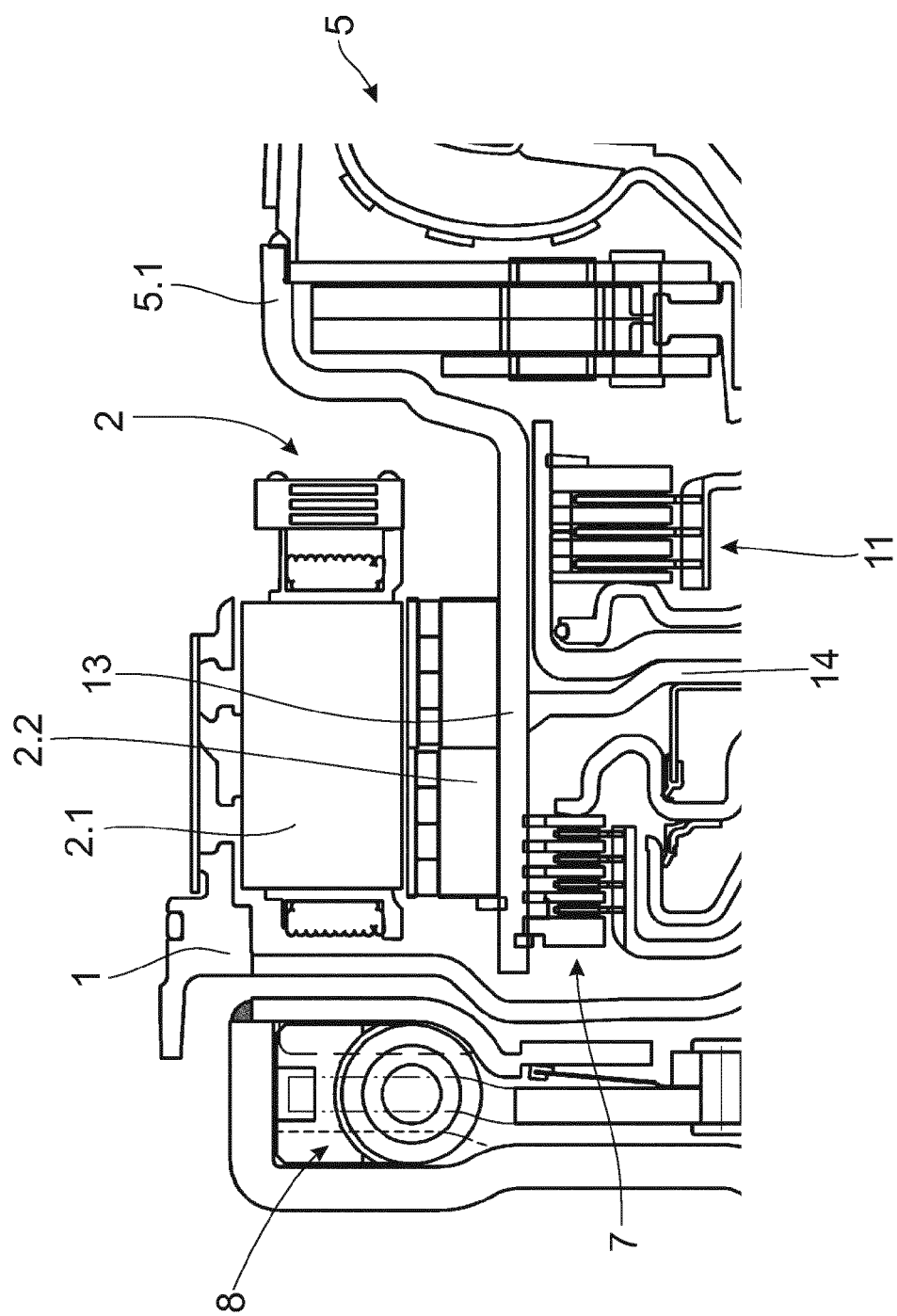
FIG. 4 a subarea of a schematic section of a hybrid module in the region of the rotor.

FIG. 2, FIG. 3, and FIG. 4 each show a subarea of a hybrid module in the region of the clutch similar to FIG. 1 for different embodiment examples. FIGS. 2 to 4 have in common that an input shaft 3 is connected to a clutch 7, more precisely, the input side thereof. Parts of the clutch, more precisely, the output side, are connected to a base body 13, which also forms the outer plate carrier. The connection element 14 is connected to the hub 4 and accordingly to the rest of the powertrain. Further, the connection element 14 is connected to the base body 13, and the base body 13 receives a rotor 2.2 on an outer circumferential surface. Accordingly, the connection element 14 and the base body 13 together form the rotor carrier.

The connecting area of the connection element 14 is constructed in FIG. 2 as a portion which is shaped in direction of the torque converter 5 and is coaxial to the base body 13. In this case, the connecting area has approximately one fourth of the length of the base body 13 in axial direction. A tilting of the connection element 14 toward the base body 13 during assembly can be prevented as a result of this length, and there is a larger surface area for producing the connection. The connection can be carried out in particular by spot welds, rivets, or by clinching.

The construction in FIG. 3 basically corresponds to the example shown in FIG. 1, but the rotor carrier is formed in one piece from the base body 13 and the connection element 14. The manufacturing cost for the rotor carrier is higher for a one-part construction, but the power flow in the rotor carrier can be improved and the assembly cost for the connection of the base body 13 and connection element 14 is eliminated.

In the embodiment example in FIG. 4, the base body 13 is formed integral with the converter housing 5.1. In this example, the sleeve-shaped base body 13 is formed by an axial end of the converter housing 5.1. The connection element 14 is constructed as a separate component part but, alternatively, could also be constructed in one part. The connection element 14 accordingly constitutes a part of the converter housing 14 in the form of a housing cover. A step against which the connection element 14 is pushed is provided at the inner circumferential surface of the base body 13 for positioning the connection element 14.

The base body 13 and the converter housing 5.1, respectively, have an area that protrudes in axial direction over the connection element 14 and in which receptacles for parts of the clutch 7 can be accommodated outside of the torque converter 5. Inside the torque converter 5, the inner circumferential surface of the base body 13 is utilized for receiving parts of the lockup clutch 11, by which an extensive utilization of installation space is achieved, and the axial installation space requirement can accordingly be reduced.

The invention is not limited to the embodiments described herein. As has already been stated, only individual advantageous features can also be provided, or various features from different examples may be combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor carrier for a rotor of an electric machine, comprising
   a tubular base body, wherein the tubular base body has an engagement element on an outer circumferential surface facing the rotor which make possible a positive engagement connection and/or frictional engagement connection between the tubular base body and the rotor;
   an inner circumferential surface defines receptacles for parts of a clutch remote of the rotor along a portion of an axial extension; and
   a connection element arranged adjacent to the receptacles configured to connect the tubular base body to a hub, comprising:
   a radially extending annular flange arranged in axial direction between the receptacles and one end of the tubular base body,
   wherein the tubular base body has at least one cutout which is continuous in a radial direction for passage of oil,
   wherein a plurality of cutouts are arranged in different planes which are axially spaced apart.

2. The rotor carrier according to claim 1, wherein the annular flange is formed by a separate component part fixedly connected to the inner circumferential surface in an axial direction as well as a circumferential direction.

3. The rotor carrier according to claim 1, wherein the annular flange is formed integrally with the tubular base body.

4. The rotor carrier according to claim 1, wherein the tubular base body is formed to be longer than the rotor at least at one axial end.

5. The rotor carrier according to claim 1, wherein the tubular base body has a different thickness in axial direction in an area of the receptacles than in an area of the connection element.

6. The rotor carrier according to claim 1, wherein the tubular base body is produced from a reformed tubular portion.

7. The rotor carrier according to claim 1, wherein the connection element has an axial portion which extends parallel to the tubular base body and is connected to the tubular base body.

8. A rotor carrier for a rotor of an electric machine, comprising:
   a tubular base body;
   an engagement element on an outer circumferential surface of the tubular base body facing the rotor configured to provide a positive engagement connection and/or a frictional engagement connection between the tubular base body and the rotor;
   an inner circumferential surface of the tubular base body remote of the rotor defining receptacles for parts of a clutch along a portion of an axial extension;
   a connection element arranged adjacent to the receptacles configured to connect the tubular base body to a hub;
   a converter housing formed integrally as a single unit with the tubular base body; and
   a radially extending housing wall or a housing cover of the converter housing that forms the connection element.

9. The rotor carrier according to claim 8, wherein the tubular base body has at least one cutout which is continuous in a radial direction for passage of oil.

10. The rotor carrier according to claim 9, wherein a respective cutout is arranged in a base area of a groove provided at the inner circumferential surface.

11. The rotor carrier according to claim 10, wherein a plurality of cutouts are arranged to be distributed over a circumference.

12. A rotor carrier for a rotor of an electric machine, comprising:
   a tubular base body having at least one cutout which is continuous in a radial direction for passage of oil;
   an engagement element on an outer circumferential surface of the tubular base body facing the rotor configured to provide a positive engagement connection and/or a frictional engagement connection between the tubular base body and the rotor;
   an inner circumferential surface of the tubular base body remote of the rotor defining receptacles for parts of a clutch along a portion of an axial extension;
   a connection element arranged adjacent to the receptacles configured to connect the tubular base body to a hub;

a converter housing formed integrally with the tubular base body; and a radially extending housing wall or a housing cover of the converter housing that forms the connection element, wherein a plurality of cutouts are arranged in different planes which are axially spaced apart.

13. A hybrid module comprising:

an input shaft;

a clutch;

an electric machine;

a torque converter;

an output shaft;

a rotor; and a rotor carrier comprising a tubular base body, wherein the tubular base body has an engagement element on an outer circumferential surface facing the rotor which make possible a positive engagement connection and/or frictional engagement connection between the tubular base body and the rotor;

an inner circumferential surface defines receptacles for parts of a clutch remote of the rotor along a portion of an axial extension; and a connection element arranged adjacent to the receptacles configured to connect the tubular base body to a hub, comprising:

a radially extending annular flange is arranged in axial direction between the receptacles and one end of the tubular base body, wherein the tubular base body has at least one cutout which is continuous in a radial direction for passage of oil, wherein a plurality of cutouts are arranged in different planes which are axially spaced apart.

* * * * *